US005144330A

United States Patent [19]

Bennett

[11] Patent Number: 5,144,330

[45] Date of Patent: Sep. 1, 1992

[54] METHOD AND APPARATUS FOR PRINTING ON PIPE

[76] Inventor: Charles G. Bennett, 1057 Racine Ave., Columbus, Ohio 43204

[21] Appl. No.: 631,841

[22] Filed: Dec. 21, 1990

[51] Int. Cl.[5] ............ G01D 15/18

[52] U.S. Cl. ............ 346/1.1; 346/75; 346/140 R

[58] Field of Search ............ 346/1.1, 140 R, 75

[56] References Cited

U.S. PATENT DOCUMENTS

| | | | |
|---|---|---|---|
| 4,378,564 | 3/1983 | Cross et al. | 346/75 |
| 4,393,386 | 7/1983 | Di Giulio | 346/75 |
| 4,769,650 | 9/1988 | Peng et al. | 346/75 |

FOREIGN PATENT DOCUMENTS 54-158232 12/1979 Japan .

*Primary Examiner*—George H. Miller, Jr.
*Assistant Examiner*—Gerald E. Preston
*Attorney, Agent, or Firm*—Biebel & French

[57] ABSTRACT

A method and apparatus for printing identification markings on pipes in a pipe processing system including a print engine having a microcontroller connected to a host or main frame computer. The print engine is connected to a printing device having a printing head which is rotatable relative to a pipe being conveyed through the printing station. Rotation of the printing head facilitates altering the character height printed by the head within a continuous range of possible sizes.

16 Claims, 4 Drawing Sheets

METHOD AND APPARATUS FOR PRINTING ON PIPE

BACKGROUND OF THE INVENTION

The present invention relates to a pipe processing system and more particularly to a method and apparatus for printing identification marks on steel pipes as they are manufactured and processed through a plant.

Pipes produced within steel plants generally must be provided with identifying marks or indicia which indicate particular production information including the production batch number or lot number, the date of manufacture, dimensional information relating to the pipe and destination information for the pipe. Such information has historically been placed on the pipes by means of stencils or, more recently, through use of ink jet printing heads driven by an appropriate microprocessor control circuit.

Further, the message to be printed on the pipe is typically typed into a terminal located near the printing area for the pipe and thus operators must be present at any printing terminals within the system in order to adjust the message to correspond to the particular type of pipe passing through the system.

Modern steel mills are capable of processing pipes at rates as high as 1,000 in./min. Thus, if it is necessary to enter a change in the indicia to be printed on the pipe, the system must either be slowed down or stopped while the operator types in a new message for the printer. In addition, the pipe processing system may also have to be shut down if one or more printing units malfunctions since proper tracking of the pipes through the steel plant is essential for inventory purposes. Such a plant shut down may result in financial losses of up to $5,000 per hour, and it is therefore essential to provide a processing system in which all of the components are as fail safe as possible.

U.S. Pat. No. 4,769,650 to Peng et al discloses a printing system for marking boxes which is similar to the systems currently in use for marking pipes in steel mills. The printing system includes a solenoid actuated nozzle module to spray ink in the form of a dot matrix onto the surface of an object and a speed sensor provides information to a microcomputer relating to the rate of the object in order to synchronize the sequence of ink spraying with the movement of the object.

While the above-described device of Peng et al is satisfactory for marking the planar surfaces of boxes, such a device suffers from certain drawbacks when put into use for printing on objects which have a radius of curvature, such as pipes. Specifically, the prior art print heads, such as shown by Peng et al, are typically formed by a plurality of spray nozzles aligned within a plane and which are positioned at a predetermined point along a conveyor path. Objects are conveyed past the spray head to receive appropriate markings in the form of dot matrix printing. When such print heads are used for printing on widely varying diameters of pipe, the print head may be satisfactory for printing on pipes having a large radius of curvature. However, when a pipe having a small radius of curvature passes through the system, the variation in distance between the various nozzles and the curved pipe surface may be large thereby resulting in the markings printing on the pipe being distorted.

Accordingly, there is a need for a printing system which is capable of printing on pipes having a wide range of diameters without distorting the message to be printed and which is capable of changing the print size and font quickly without causing undue delay in the processing of the pipe through the system. In addition, there is a need for a printing system which is economical and which may be easily replaced in the event of a malfunction occurring in the printing system, and the system should be easily controlled to alter the message to be printed to thereby minimize down time of the pipe processing system.

Further, there is a need for a pipe printing system which may be used as an integrated part of an inventory system within a steel mill for processing pipe such that messages to be printed on the pipes passing through the system may be altered automatically in accordance with messages from a main frame or host computer for controlling the inventory within the steel mill.

SUMMARY OF THE INVENTION

It is an object of the present invention to provide a method of spraying identification markings on pipe within a pipe processing system which includes a main frame or host computer having a memory for storing information relating to pipe in the system, a print engine having a microcontroller connected to the host computer, and a print station having a printer connected to the print engine.

In the method of the present invention, inventory data corresponding to a pipe in the system is input into the host computer. The pipe is subsequently conveyed into the print station and a message is transmitted from the host computer to the print engine to determine whether the print engine is able to receive a message to be printed on the pipe.

The print engine may then indicate that it is ready to receive a message containing pipe identification data from the host computer, which message is stored within a memory portion of the microcontroller. The identification data is then printed on the pipe in response to the pipe passing through the print station and triggering a sensor providing an input signal to the print engine to activate the printer.

The pipe processing system may be further provided with a plurality of print engines connected to the host computer through a common data line and a common address line and wherein the method includes the step of the host computer addressing a selected print engine through the address line to thereby transmit and receive data to and from the selected print engine.

The method of the present invention may further include the step of providing a rotating print head adapted to rotate about an axis of the print head to adjust the height of the characters printed. In addition, the print head may be rotated in response to a signal from the print engine.

It is a further object of the present invention to provide an apparatus for printing an identification marking on a pipe. The apparatus includes means for transporting a pipe along a predetermined path and a print station located adjacent to the transport means for printing markings on the pipe as the pipe is conveyed along the predetermined path.

The print station includes a print head and means for positioning the print head relative to the pipe. The print head includes a plurality of nozzles for spraying dots of ink forming the markings on the pipe.

Control means are provided for controlling actuation of the nozzles such that dots of ink are sprayed from the nozzles at predetermined locations along the pipe, and the print head may be rotated about a rotational axis of the print head to effect changes in the height of the markings formed by the dots. Thus, by rotating the print head, the height of the markings may be varied within a continuous predetermined range.

The control means preferably includes a microcontroller and solenoids for controlling ink flow to each of the nozzles. A message transmitting the markings to be printed is preferably received from a host computer connected to the microcontroller and an encoder is provided for sensing the distance traveled by the pipe as it is conveyed past the print station whereby the rate at which the markings are printed is controlled in relation to the movement of the pipe.

Other objects and advantages of the invention will be apparent from the following description, the accompanying drawings and the appended claims.

DETAILED DESCRIPTION OF THE PREFERRED EMBODIMENT

Figure 1:
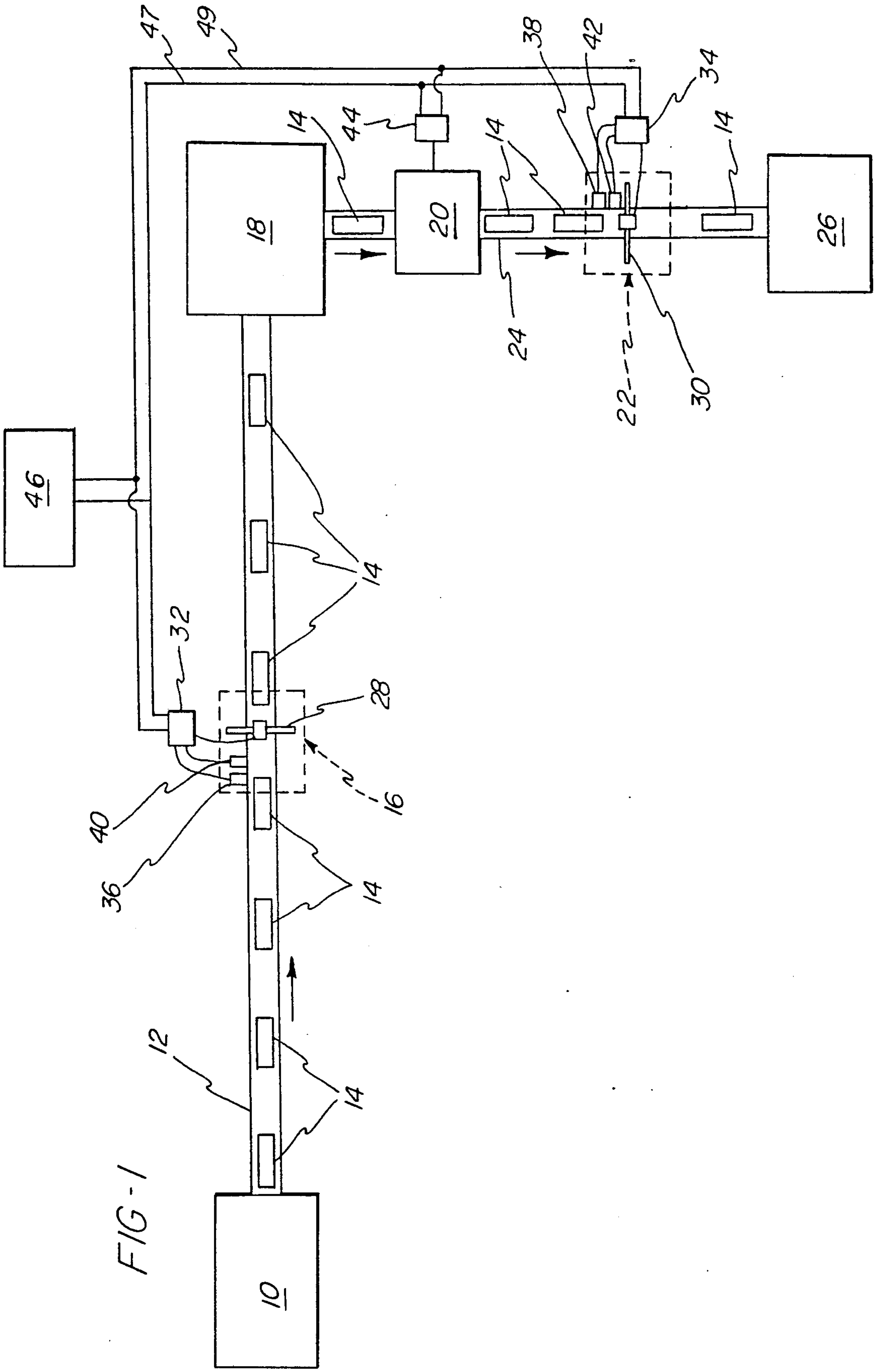
FIG. 1 is a diagrammatic plan view of the present invention as it is incorporated in a typical steel pipe production plant.

Referring to FIG. 1, a lay-out for a typical pipe processing plant is shown and includes a pipe manufacturing or production station 10 for producing steel pipe to predetermined dimensions. A transport device such as a conveyor 12 may be provided for conveying pipe 14 from station 10 to a printing station, designated generally as 16.

At the print station 16, markings such as letters and numbers are printed on the pipe 14 to provide production and identification data on the pipe 14 whereby the pipe may be tracked throughout the pipe processing system. Subsequently, the pipe is transferred to a storage area 18 where it may be stored for an indefinite period of time until a customer order is received requiring the pipe to be prepared for shipping.

When an order for a particular type of pipe is received, the pipe 14 is transported from the storage area 18 to an intermediate pipe finishing station 20 where the pipe 14 may be heated and reworked to straighten the pipe and to conform it to specific dimensional requirements of the customer. In addition, the pipe may be measured, weighed and tested for imperfections while at the intermediate station 20.

During the refinishing operation at station 20, the identification markings on the pipe 14 are typically burnt off or otherwise made unintelligible during the reheating of the pipe such that the pipe must be provided with new markings prior to shipment. Therefore, a second print station 22 is provided and a transport conveyor 24 is located between the intermediate station 20 and the second print station 22 to convey pipes through the printing station 22 where markings are placed on the pipe corresponding to identification data for the pipe. The identification data may include final customer destination information as well as data collected from measurements made at intermediate station 20.

Finally, after the pipes have received their identification markings at print station 22, they are transferred to a shipping station 26 where they exit the pipe processing system and are typically shipped to an appropriate customer.

It should be noted that each of the first and second print stations 16 and 22 include first and second marking or printing devices 28, 30, respectively. The printing devices 28, 30 are driven by print engines 32 and 34 which will be described further below. In addition, position sensors 36, 38 and rate or movement sensing devices such as encoders 40, 42 are provided at each of the stations 16, 22 to sense an incoming pipe 14 and to determine the rate of movement of the pipe as it passes through the stations 16, 22. The position sensors 36, 38 and rate sensors 40, 42 are connected to the print engines 32, 34 at their respective stations 16, 22 to provide inputs to the print engines 32, 34 whereby the printing devices 28, 30 may be accurately controlled to print the desired markings on the pipes.

An additional print engine 44 is provided at the intermediate station 20 to collect and store data as it is measured at this station. All three print engines 32, 34 and 44 are formed with the same construction which will be described below.

The print engines 32, 34, 44 operate under the direct control of a host or main frame computer 46. The computer 46 preferably contains all inventory information for the pipe production plant as well as information regarding customer orders such that all of the information regarding plant operations is coordinated by host computer 46.

The print engines 32, 34, 44 at the printing stations 16, 22 receive messages to be printed in serial ASCII format along a common data line 47, and the print engine 44 at the intermediate station 20 transmits measurement data along the same data line 47 to the computer 46. A common address line 49 is used by the host computer 46 to address the individual print engines 32, 34, 44 for transmitting and receiving data along the data line 47.

Figure 2:
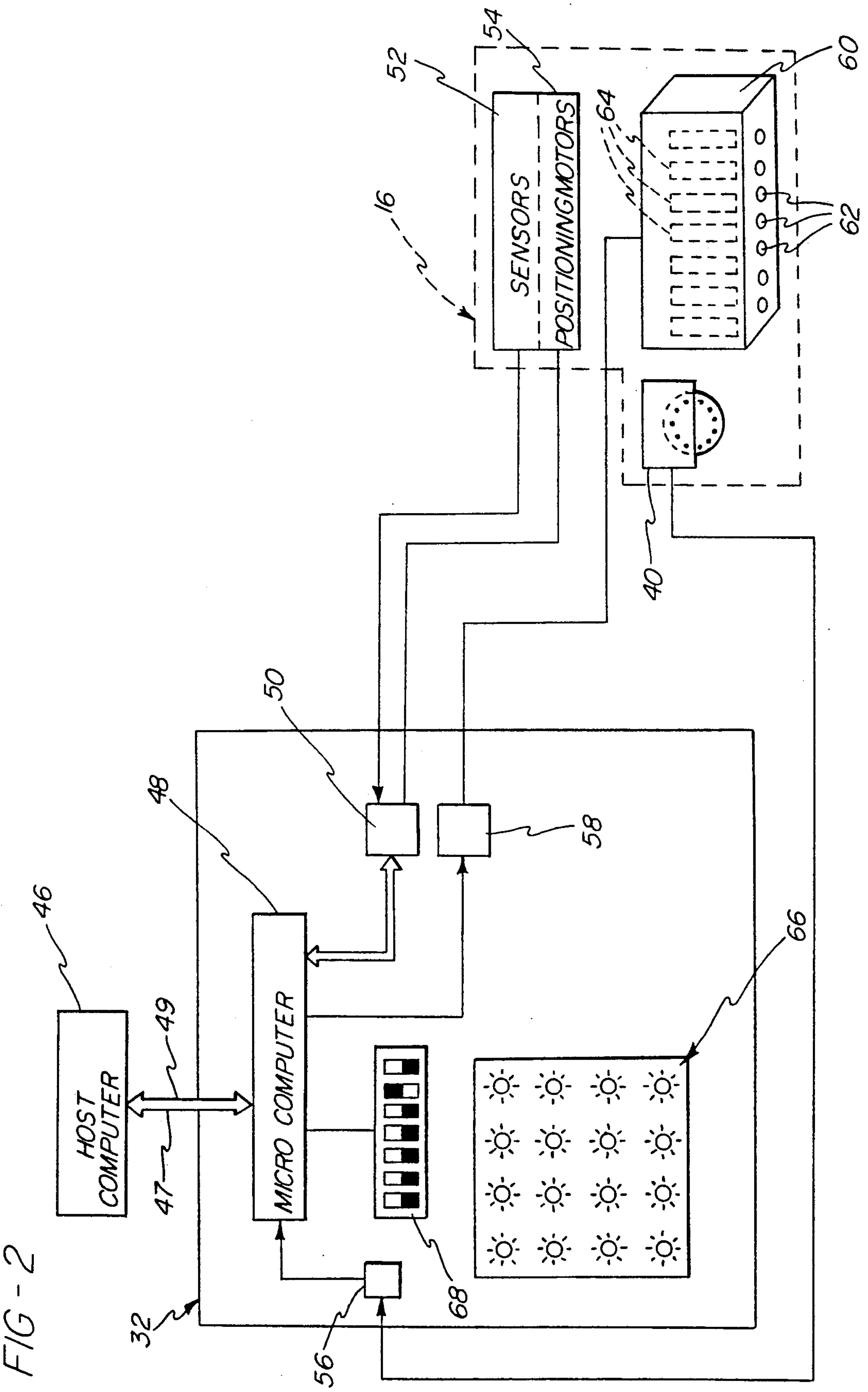
FIG. 2 is a block diagram of the print engine of the present invention.

Referring to FIG. 2, the print engine of the present invention will be described in further detail with reference to the print engine 32 positioned at the first print station 16. The print engine 32 includes a microcontroller such as Model No. DS5000-32 made by Dallas Semiconductor Corp. of Dallas, Tex., which includes a microprocessor, a preprogrammable read only memory, and a random access memory. An input/output port is provided having buffer means 50 for translating the signal levels between the microcontroller 48 and devices exterior to the print engine 32. Signals from sensors, indicated generally as 52, and which may include the position sensor 36, pass through the buffer 50 before being transferred to the microcontroller 48. Similarly, signals from the microcontroller 48 to exterior devices such as positioning motors 54 for controlling a printing head on the printing device 28 must first pass through the buffer means 50 to translate the signal level to a level sufficient to drive the motors.

The encoder 40 is provided with a separate buffer means 56 and a pulsed signal is transferred to an interrupt port on the microcontroller 48 such that an interrupt driven serial system is formed for determining the number of counts received from the encoder 40. The encoder 40 may be of a conventional type such as 840E Series Encoder made by Allen-Bradley of El Paso, Tex. having a wheel with a circumference of 1 ft. and producing 1,024 pulses per revolution. By positioning the encoder wheel against either the conveyor 12 or a pipe 14 passing through the printing station 16, the encoder wheel will be driven at a rate directly proportional to the rate of the pipe and the number of pulses produced by the encoder 40 will be directly proportional to the distance travelled by the pipe as it passes through the printing station.

A solenoid driving output port is provided having buffer means 58 which includes level translators and relay meanswhereby the output signal of the microcontroller may be translated to a sufficient voltage to drive solenoid valves on a print head 60 which is positioned on the printing device 28. The print head 60 may be of a commercially available type such as the TASK PH4-7/PH2-7 print head manufactured by Task Technology, Inc. of Chillicothe, Ohio.

As seen in FIG. 2, the print head 60 is provided with seven ink jet orifices 62 positioned along a substantially straight line and which are controlled by individual solenoid control valves 64, as seen diagrammatically in phantom lines. The solenoid control valves 64 each receive ink from a common ink supply line (not shown) in a conventional manner for supplying ink to the individual nozzles 62. The solenoid control valves 64 may be selectively actuated by the microcontroller 48 via the buffer means 58 to spray various patterns of dots from the nozzles 62 onto pipes passing through the print station 16.

The print engine 32 is further provided with a panel of LED display lights 66 which provide an operator with a visual read-out of the operation of the print engine 32. For example, seven of the LED lights indicate the individual operation of each of seven lines leading to the solenoid control valves 64 and other of the lights indicate activation of lines to the microcontroller 48 as a result of signals passing through the buffer means 50, 58 and 56.

As mentioned above, the microcontroller 48 receives and sends signals to the host computer 46 in serial form via a data line 47. A standard RS-232 port is provided between the microcontroller 48 and the host computer 46 through which messages to be printed by the print head 60 may be transferred to the microcontroller 48 and messages relating to the status of the microcontroller may be transferred to the host computer 46.

The address signal by which the host computer 46 may address the microcontroller 48 may be set by means of a DIP switch 68, and the switch 68 may also be used for setting the microcontroller for a diagnostic mode of operation. The address of the print engine may be selected to three places on the switch 68 such that as many as seven print engines may be provided with individual addresses.

The structure of the print engine 44 in the intermediate station 20 is identical to the structure described above with regard to print engine 32. However, print engine 44 will typically only utilize the input lines from sensors sending signals to the microcontroller 48 through buffer means 50, although an encoder may also be incorporated to monitor the length of each pipe passing through this station.

Figure 3:
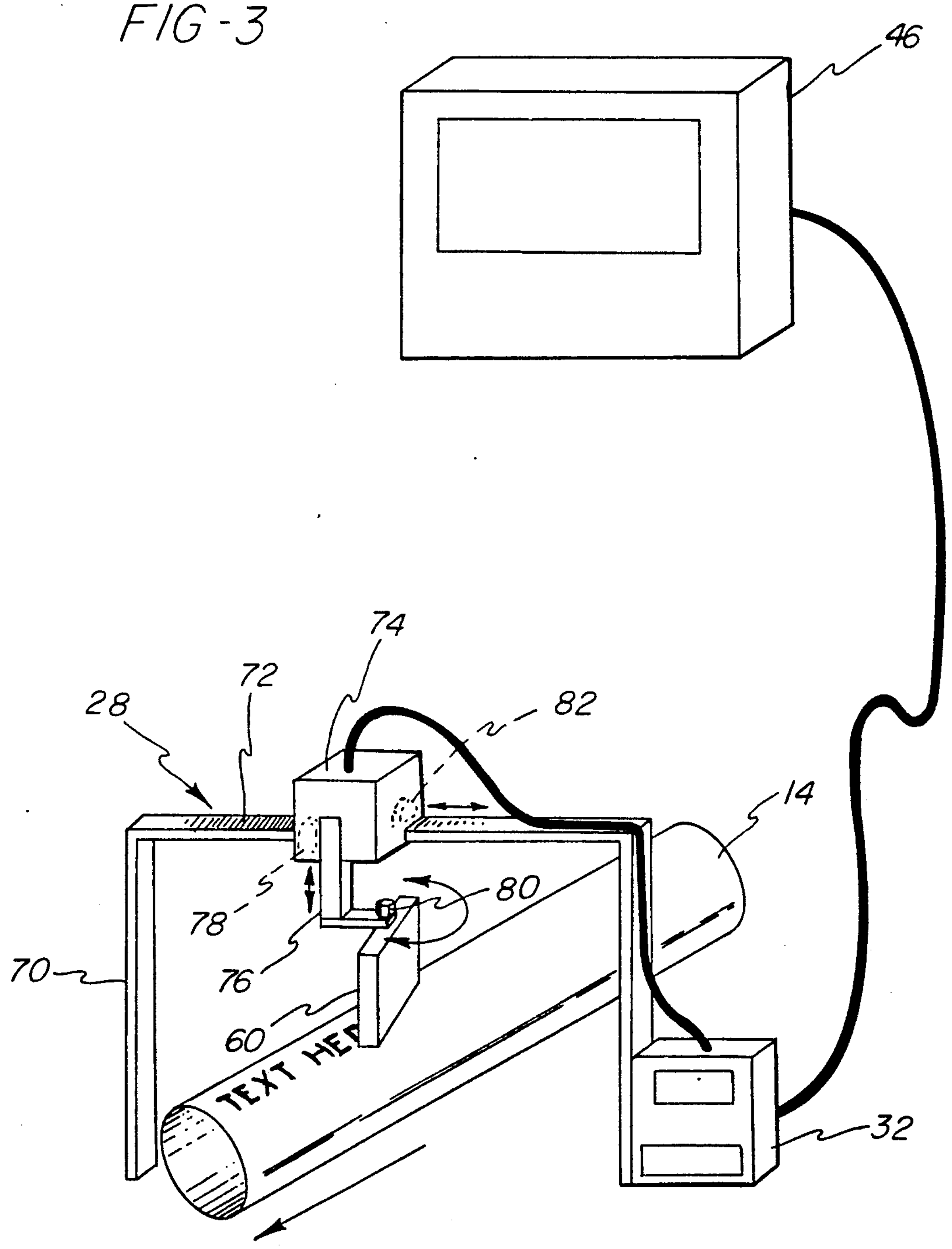
FIG. 3 shows details of the print head in position at a printing station for printing markings on pipe.

Referring to FIG. 3, details of the printing device 28 of the first print station 16 are shown. The printing device 28 includes a support frame structure 70 extending over the path followed by the pipe as it passes through the print station 16, and the support frame 70 includes a cross piece 72 for supporting a movable print head carriage 74.

A support arm 76 extends downwardly from the carriage 74 and supports the print head 60 such that the nozzles 62 point downwardly toward a pipe passing underneath the print head 60.

A vertical positioning or actuation motor 78 is shown diagrammatically and is provided for moving the arm 76 upwardly and downwardly to thereby position the print head 60 closely adjacent to the upper portion of a pipe passing through the print station 16, and the diameter of the pipe being labeled will dictate the particular height selected for the print head 60.

Another motor 80 is provided adjacent to the connection between the support arm 76 and the upper portion of the print head 60. The motor 80 drives the print head 60 for rotation relative to the support arm 76 about a vertical axis perpendicular to the path followed by the pipe 14 as it passes through the print station 16. By rotating the head 60 about its vertical axis, the height of the letters formed by dots emitted from the nozzles 62 may be varied such that the largest letters may be formed when the print head 60 is oriented with its longitudinal axis perpendicular to the direction of the pipe, and the height is decreased as the longitudinal axis of the print head 60 is rotated toward a direction parallel to the pipe 14.

The printing device 28 is also provided with an actuation motor 82 for moving the carriage 74 horizontally perpendicular to the direction of pipe travel to thereby move the print head 60 out alignment with pipes passing through the print station 16. When the printing head 60 is positioned to the side of the print station 16, the nozzle 62 may be pulsed in a predetermined sequence by the microcontroller 48 to thereby clear the nozzle 62 of any ink that may accumulate during regular operation of the system. Either the host computer 46 or the microcontroller 48 may be programmed to transfer the print head 60 to the side of the print station at regular intervals to thereby automatically clear the nozzles and prevent down time which may occur if the system is operated on a continuous basis without a cleaning step for the nozzles.

It should be noted that the positioning motors 78, 80, 82 correspond to block 54 in FIG. 2. Thus, the motors 78, 80, 82 may be driven by the print engine 32 such that the positioning of the print head 60 is performed automatically. Further, the motors 78, 80, 82 may be in the form of stepper motors or other mechanisms adapted to provide precise positional control.

The operation of the system will now be described with particular reference to the operative relationships between the print engine 32, the host computer 46 and the print head 60. Initially, the host computer 46 is provided with information regarding the inventory of pipe within the processing system. This information may relate to the lot number of the pipe, the dimensions of the pipe and any other production or inventory information which may be necessary to track the pipe through the system or to send it to the appropriate customer.

With the host computer 46 thus ready to provide a message to the print engine 48, the host computer 46 sends a message to the print engine 32 to query the status of the print engine 32. In response to the query status message, the print engine 32 may send one of a variety of possible messages such as that the print engine is currently printing a message on a pipe, that the print engine is idle and ready to receive a message from the host computer or that the print engine has received a valid message which it is ready to print.

When the host computer 46 receives the message that the print engine is ready to receive a message to be printed, the host computer sends a serial message in ASCII format to the print engine which includes data fields providing the message to be printed on the pipe, a font selection number, any delay time for starting the printing of a message, the angle of the print head relative to the pipe, the direction in which the message is to be printed and the orientation of the message. It should be noted that the message may be printed either backwards, in which case its orientation would normally be upside down, or it may be printed in a forward direction, in which case its orientation would normally be right side up.

The print engine is programmed to print certain selected fonts such as 5×5 (5 pixels or dots wide by 5 pixels high), 5×7 or 7×7. However, it should be noted that through rotation of the print head 60 a continuous range of character heights may be selected within a range determined by the distance from the outermost end nozzles on the print head, as the largest height, and the diameter of the dots formed by the nozzles 62, as a lower limit to the character size formed by the print head 60.

After the print engine 32 has received the message from the host computer 46, it performs a check to verify that the message is valid. The check includes checking the number of all ASCII digits in the message and comparing it to a check sum number sent with the message and which corresponds to the number of digits in the message. If a valid message has been received, the print engine will send a message to the host computer 46 acknowledging the message. If an invalid message has been received, the print engine 32 will send a message to the host computer 46 stating that the message was not acknowledged and giving a reason for non-acknowledgement in order to assist the host computer 46 in determining the problem.

Once a valid message has been received, the print engine 32 will store the message to be printed in a memory portion of the microcontroller 48 and the microcontroller 48 will wait to receive a signal from the position sensor 36 indicating that a pipe 14 is entering the print station 16.

Once a pipe enters a print station and triggers the position sensor, the print engine proceeds with a preprogrammed printing sequence in which the message, which is usually in the form of letters and numerals, is printed in a dot matrix format on the pipe by the print head 60. The print head 60 sprays dots of ink at predetermined points along the pipe as the pipe travels through the print station.

It should be apparent that by controlling the individual nozzles 62 of the print head 60 to spray at predetermined points in time as the pipe 14 passes underneath the print head 60, a large variety of markings or characters may be produced on the pipe. For example, when the print head 60 is perpendicular to the pipe such that the entire row of nozzles is aligned with the direction of travel of the pipe, a character may be printed by first actuating the appropriate nozzles for producing dots forming the first row, then the second row, third row, etc. . . . until the complete character has been printed. The microcontroller will reference the encoder during the formation of the characters such that each sequential row of dots forming the character is spaced a predetermined number of encoder pulses from the previous row of dots. Thus, the printing of the characters is precisely synchronized with the movement of the pipes through the printing station such that the appearance of the characters will remain the same regardless of the speed of the pipe as it passes the print head 60.

In the preferred embodiment, the print head 60 includes seven nozzles, with a center-to-center distance between the nozzles 62 of one inch, and the nozzles 62 each spray a one-quarter inch dot. Thus the maximum printing height for the print head 60 would be approximately six inches with a pixel or dot spacing of one inch. With the printing head oriented substantially perpendicular to the path of the pipe, the microcontroller 48 would automatically delay the printing of each row such that there is the required spacing between dots, such as a one-inch spacing between dots along the width of the character in the lengthwise direction of the pipe to produce a 5×5 or 7×7 character font.

As noted above, the print head 60 may be oriented at an angle relative to the direction of travel of the pipe 14 through the print station. Rotating the head about a vertical axis in such a manner provides the advantage that when a small diameter pipe having a large radius of curvature is being printed upon, the head 60 may be oriented with substantially all of the nozzles located over and in close proximity to the surface of the pipe, whereas if the print head 60 remained perpendicular to the longitudinal direction of the pipe, the end nozzles may extend beyond the edge of the pipe and several of the nozzles 62 may be spaced too far from the portion of the pipe surface being sprayed to provide a legible character.

Rotation of the print head 60 has the further advantage that the pixel spacing in the vertical direction will be decreased as the row of nozzles 62 move closer to a line parallel to the longitudinal direction of the pipe thus allowing for increased character resolution. With the decrease in pixel or dot spacing in the vertical direction of the character, the microcontroller 48 will also decrease the spacing between the pixels or dots in the horizontal direction such that the text will not be distorted with the decrease in pixel spacing.

Figure 4:
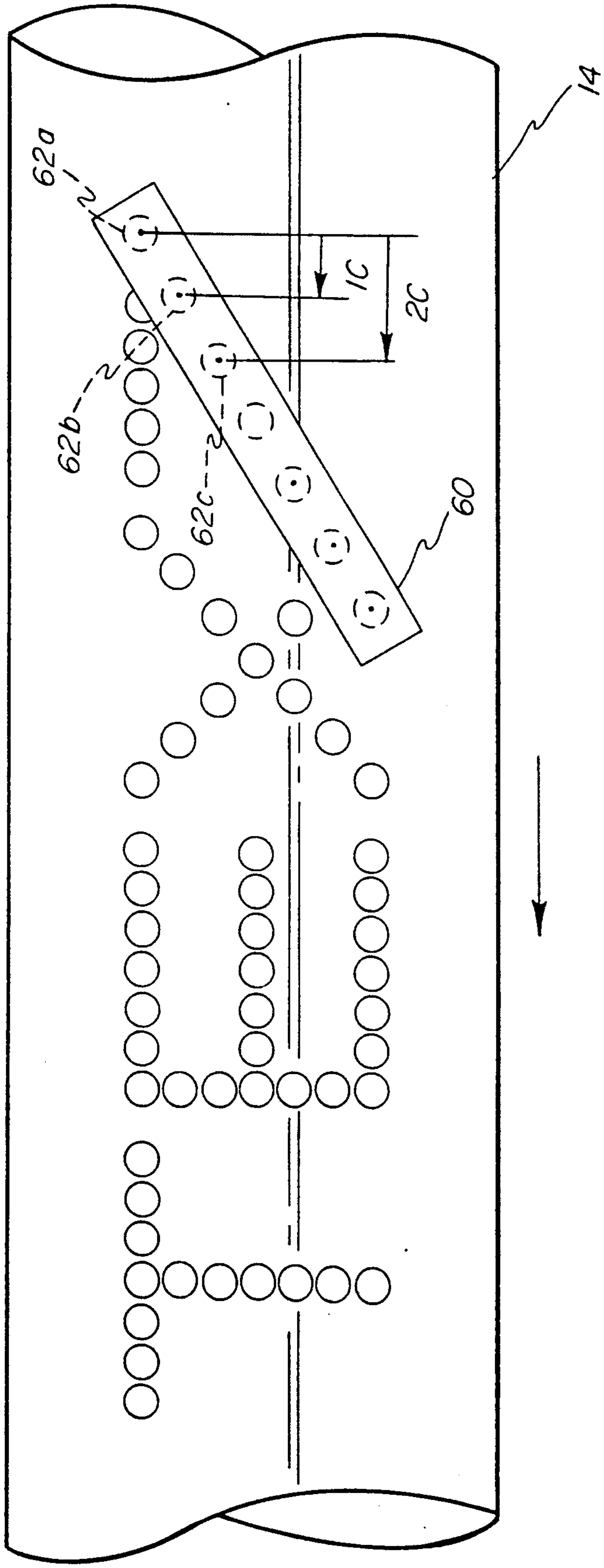
FIG. 4 illustrates a printing process in accordance with the present invention.

In addition to adjusting the delay between printing the individual rows of dots forming the text of the message, the microprocessor must also provide a delay to compensate for the angular movement of the nozzles 62 away from a line perpendicular to the text being printed. This is illustrated in FIG. 4 in which the upper nozzles of the print head 60 are shown printing the last character of the message and the lower nozzle is still in the process of completing the next to last character.

A delay count must be added to the number of encoder pulses that the microcontroller counts for controlling each of the nozzles when printing a character. As can be seen in FIG. 4, in order to print a vertical line nozzle *62a* must discharge an ink dot before nozzle *62b* and the delay in discharging a dot from *62b* may be expressed as nC where n is equal to an integer number corresponding to a nozzle number and C is a horizontal distance between adjacent nozzles measured by the number of encoder counts which occur as the pipe traverses this distance. Thus, nozzle *62b* may be considered to be nozzle No. 1 such that n equals 1 and the discharge from nozzle *62b* is delayed by an amount equal to C as compared to an arrangement in which nozzle **62*b* is located directly below 62*a***.

Similarly, nozzle **62*c* corresponds to nozzle No. 2 and the time at which nozzle 62*c* is activated is delayed by an amount equal to 2C, as compared to the time at which nozzle 62*c* would be activated if it were directly below nozzle 62*a*. All of the nozzles are provided with a delay in the same manner such that the text characters printed on the pipe will have the same appearance as text characters printed when the print head 60** is oriented with its longitudinal axis perpendicular to the direction of pipe movement.

It should be apparent from the above description that the size of the character, including the height and width, may be altered within a continuously variable range while maintaining the same character font. Further, it should be apparent that the font may be altered by simply disabling nozzles on the print head 60 and producing the desired characters with the remaining nozzles. For example, the message shown in FIG. 4 could be printed using a 5×5 font, rather than the 7×7 font shown, by disabling the lower two nozzles, in which case the microcontroller 48 would also use a different printing program to produce characters having a width of only 5 pixels rather than 7 pixels.

It should be apparent that the present invention provides a system which is adapted to print on various sizes of pipes while maintaining text quality and legibility. In addition, the present system provides a modular print engine which may be quickly connected to and disconnected from the host computer and printing station for quick replacement in the event that a malfunction occurs within the print engine, thus reducing the amount of down time for repairs. Further, the LED display 66 provides means whereby a malfunction within the print engine may be quickly diagnosed such that replacement of the print engine will not be delayed by lengthy diagnostic evaluation.

While the method herein described, and the form of apparatus for carrying this method into effect, constitute preferred embodiments of this invention, it is to be understood that the invention is not limited to this precise method and form of apparatus, and that changes may be made therein without departing from the scope of the invention, which is defined in the appended claims.

What is claimed is:

1. In a pipe processing system comprising a host computer having a memory for storing information relating to pipe in said system, a print engine having a microcontroller connected to said host computer, and a print station having a printer connected to said print engine; a method of providing pipe with an identification mark comprising the steps of:

inputting inventory data to said host computer corresponding to a pipe in said system, conveying said pipe into said print station, transmitting a message from said host computer to said print engine querying the status of said print engine, transmitting a message from said print engine to said host computer indicating that said print engine is ready to receive a message to be printed, transmitting a message to be printed from said host computer to said print engine, said microcontroller including a memory for storing said message and said message containing pipe identification data, providing an input signal to said print engine in response to a predetermined position of said pipe in said print station, said input signal causing said print engine to initiate a print operation wherein said print engine activates said printer to print said message containing pipe identification data.

2. The method of claim 1, wherein said pipe is conveyed past said printer and sensing means are provided for sensing the distance travelled by said pipe through said print station, further including the step of transmitting an output from said sensing means to said print engine, and said print engine adjusting the rate at which said pipe identification data is printed with reference to said sensing means output.

3. The method of claim 1, wherein said printer includes a print head having a plurality of spaced ink nozzles for printing characters of said message, further including the step of rotating said print head about an axis of said print head to adjust the height of said characters.

4. The method of claim 3, wherein said axis about which said print head is rotated is perpendicular to the direction in which said pipe is conveyed into said print station.

5. The method of claim 3, wherein said print head is rotated in response to a signal from said print engine.

6. The method of claim 3, wherein selected ones of said nozzles are disabled to adjust the font of said characters.

7. The method of claim 1, wherein said pipe processing system includes a plurality of print engines connected to said host computer through a common data line and a common address line and including the step of said host computer addressing a selected print engine through said address line to thereby transmit and receive data to and from said selected print engine.

8. The method of claim 1, wherein said microcontroller memory is provided with a plurality of predetermined messages for transmission to said host computer indicating the operating status of said print engine, said plurality of messages including messages indicating to said host computer that said print engine is ready to receive a message, that said print engine has received a valid message and that said print engine is printing a message.

9. The method of claim 1, wherein information corresponding to the font and character size of the message to be printed is transmitted from said host computer to the print engine in an ASCII character string containing the message to be printed.

10. In a pipe processing system comprising a host computer, a pipe production station, a first marking station having a first labeling device, a pipe storage area, an intermediate pipe finishing station, a second marking station having a second labeling device, and each of said first and second marking stations and said intermediate station including a print engine containing a microcontroller connected to said host computer, a method of monitoring and identifying pipe comprising the steps of:

forming pipe having predetermined dimensions in said pipe production station, transmitting production data identifying said pipe produced in said pipe production area to said host computer, transporting said pipe to said first marking station, transmitting production data for said pipe from said host computer to said print engine in said first marking station, transmitting predetermined signals from said print engine to said first labeling device causing said first labeling device to print a message on said pipe corresponding to said production data, transferring said pipe to said storage area, inputting a request for said pipe into said host computer, transferring said pipe to said intermediate station, measuring a set of performance and physical characteristics of said pipe and inputting said measurements into said print engine at said intermediate station, transmitting measurement data corresponding to said measurements from said intermediate station print engine to said host computer, transferring said pipe to said second marking station, transmitting identification data, including production data and measurement data for said pipe, from said host computer to said print engine in said second marking station, transmitting predetermined signals from said print engine in said second marking station to said second labeling device causing said second labeling device to print a message on said pipe corresponding to said identification data.

11. Apparatus for printing an identification marking on a pipe comprising:

transport means for conveying said pipe along a predetermined path, a print station located adjacent to said transport means for printing said marking on said pipe as said pipe is conveyed along said predetermined path, said print station including an elongated print head and positioning means for positioning said print head relative to said pipe, control means for controlling actuation of said print head whereby ink is sprayed from said print head at predetermined locations along said pipe to produce said markings as said pipe is conveyed through said print station, said control means actuating said positioning means to rotate said print head about a rotational axis of said print head to effect changes in the height of said markings, and wherein said print head is positioned above said transport means, and said control means further actuates said positioning means to move said print head toward and away from said transport means and parallel to said rotational axis whereby the vertical distance between said print head and said pipe may be adjusted.

12. The apparatus of claim 11, wherein said head includes a plurality of nozzles aligned along a substantially straight line oriented substantially perpendicular to said rotational axis, said rotational axis being oriented substantially perpendicular to said predetermined direction for conveying said pipe.

13. The apparatus of claim 11, wherein the height of said markings is continuously variable within a predetermined range.

14. The apparatus of claim 11, wherein said control means includes a microcontroller and a solenoid for controlling ink flow to each of said nozzles, said microcontroller producing pulsed signals to actuate said solenoids and print letters and numbers forming said markings.

15. The apparatus of claim 14, including a host computer connected to said microcontroller, said host computer transmitting messages to said microcontroller corresponding to said markings to be printed on said pipe and said microcontroller including means for storing said messages.

16. The apparatus of claim 14, including an encoder for sensing the distance traveled by said pipe as it is conveyed along said transport means, said encoder connected to said microcontroller, wherein said microcontroller receives a signal from said encoder for controlling the rate at which said markings are printed in relation to the distance traveled by said pipe to thereby print uniform markings regardless of variations in the rate of said pipe.

* * * * *